United States Patent [19]

Inoue

[11] Patent Number: 4,624,237
[45] Date of Patent: * Nov. 25, 1986

[54] DIAMOND SAW

[76] Inventor: Jiro Inoue, 6-5 303, Kami Tsuruma 5-chome, Sagamihara-shi, Kanagawa, Japan

[*] Notice: The portion of the term of this patent subsequent to Jul. 24, 2001 has been disclaimed.

[21] Appl. No.: 706,875

[22] Filed: Feb. 28, 1985

Related U.S. Application Data

[63] Continuation-in-part of Ser. No. 618,577, Jun. 8, 1984, abandoned.

[51] Int. Cl.$^4$ .............................................. B28D 1/04
[52] U.S. Cl. .................... 125/15; 51/206 R; 51/267; 51/356
[58] Field of Search ............. 51/206 R, 206 NP, 207, 51/266, 267, 356; 125/15, 18

[56] References Cited

U.S. PATENT DOCUMENTS

| | | | |
|---|---|---|---|
| 927,164 | 7/1909 | Puffer | 51/267 |
| 2,268,663 | 1/1942 | Kuzmick | 51/206 R |
| 2,811,960 | 11/1957 | Fessel | 125/15 |
| 3,127,887 | 4/1964 | Metzger | 51/206 R |
| 3,162,187 | 12/1964 | Christensen | 125/15 |
| 3,338,230 | 8/1967 | Lindblad | 125/15 |
| 3,353,526 | 11/1967 | Daem | 125/18 |
| 3,742,655 | 7/1973 | Oliver | 51/266 |
| 3,754,359 | 8/1973 | Scandaletos | 51/356 |
| 4,461,268 | 7/1984 | Inoue | 51/206 R |

Primary Examiner—Harold D. Whitehead
Attorney, Agent, or Firm—Fay, Sharpe, Fagan, Minnich & McKee

[57] ABSTRACT

A diamond saw for cutting hard materials, in which a steel plate is fixed with a sintered abrading body consisting of diamond abrasive granules and a bonding metal powder, characterized in that a plurality of grooves are provided on the surface of both the front and back side faces of the sintered abrading body.

11 Claims, 16 Drawing Figures

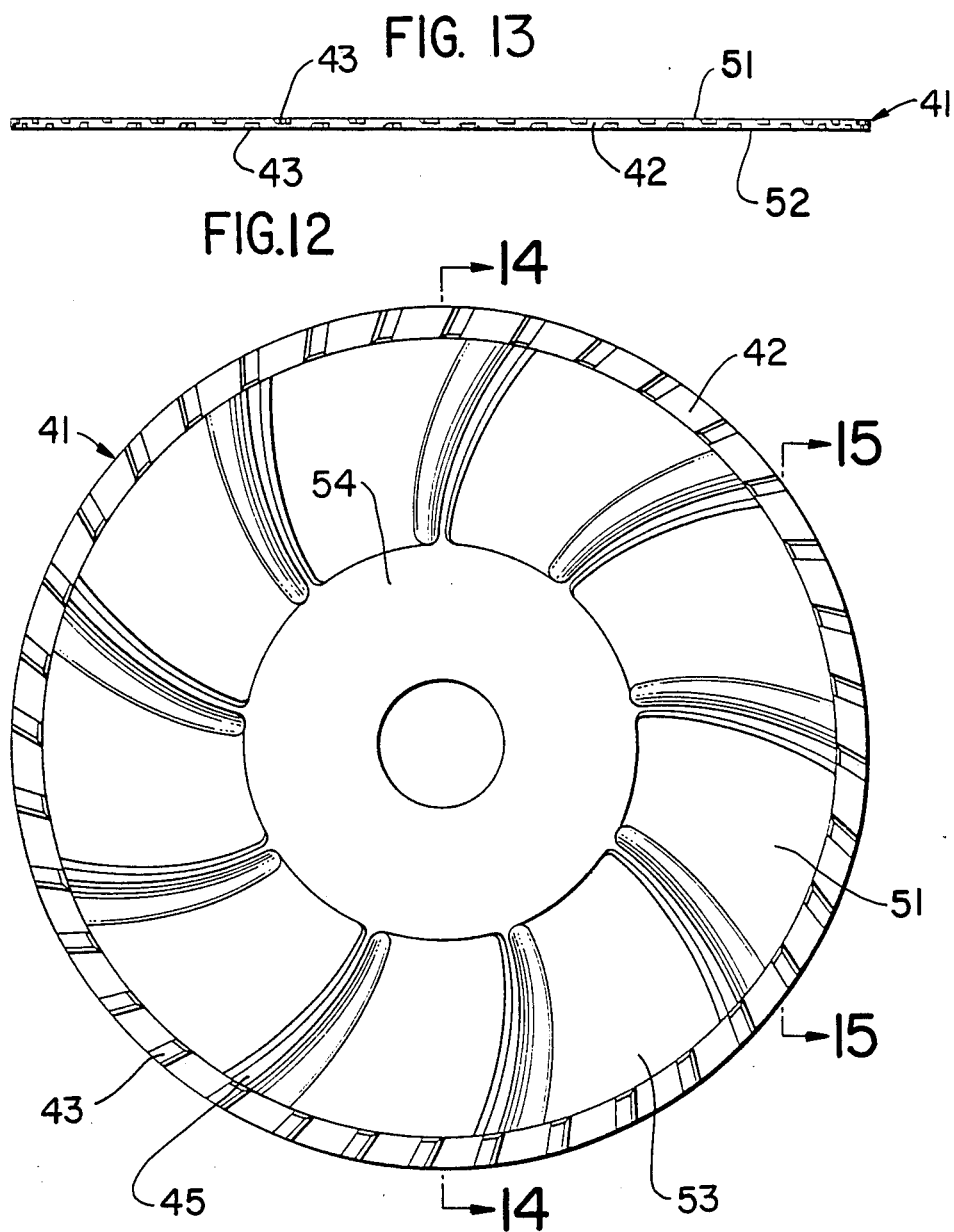

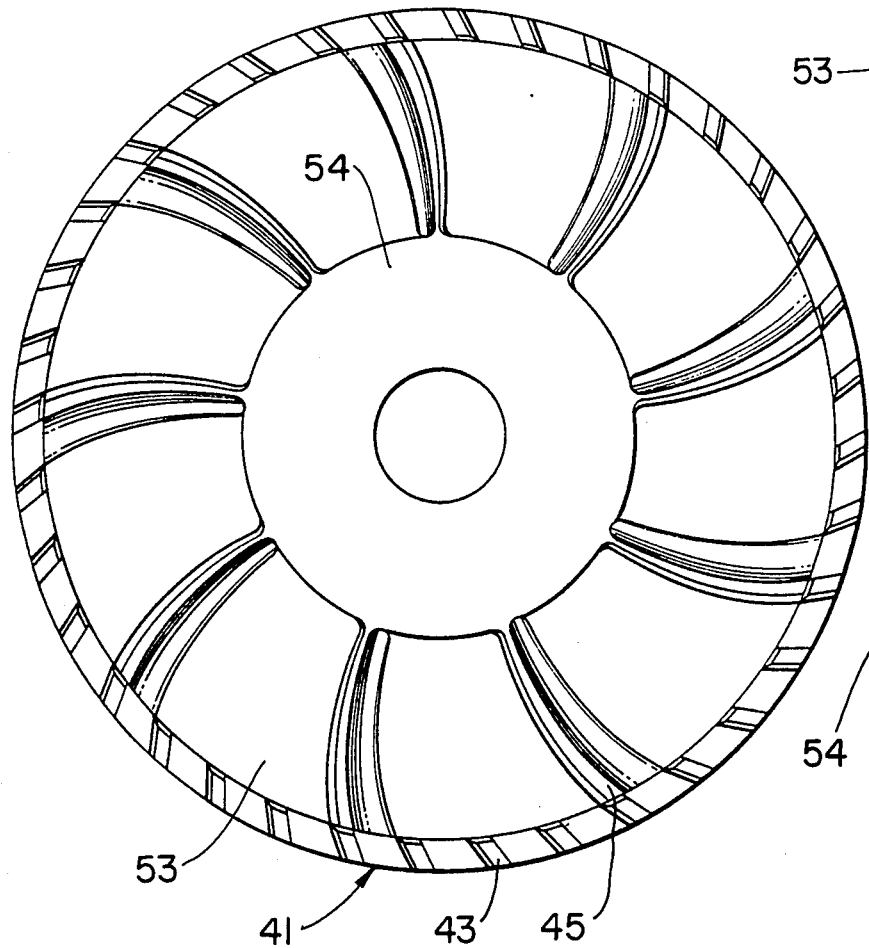
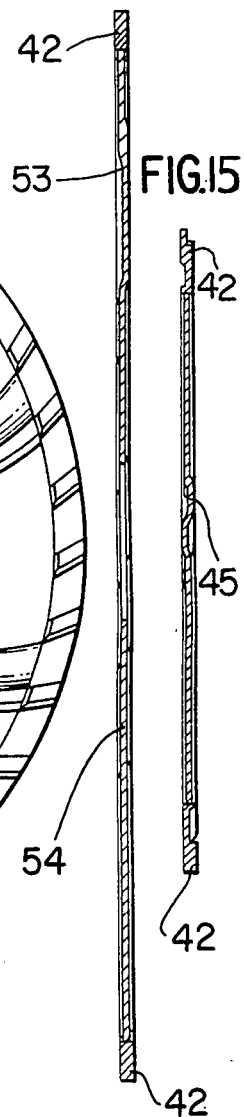

DIAMOND SAW

This application is a continuation-in-part of application Ser. No. 618,577, filed June 8, 1984 and now abandoned.

BACKGROUND OF THE INVENTION

This invention relates to an improvement in a diamond saw, and more particularly in a sintered abrading body including diamond abrasive particles embedded in a matrix.

Circular saws and plate-form saws are known as tools for cutting hard materials. The class of circular saws has two types a continuous type (rim type) and a segment type, while plate-form saws are grouped generally into gang saws and band saws.

The following are the merits and demerits in the use of various types of these saws:

(1) The continuous type saw is constructed in such a way that an abrasive granule layer is continuously, firmly fixed at the outer circumference of a steel disc, so that a stripe-pattern based on saw feeding does not appear on the cutting surface of the material to be cut, the finishing surface is beautiful, and the saw seldom encounters a breaking accident. However, the demerit of the saw is that it has a slow cutting speed.

(2) The segment type saw is constructed in such a way that an abrasive granule layer of segment type is firmly fixed by brazing, leaving spaces, at the outer circumference of a steel disc, so that the front edge of each segment act as cutting edges to increase the cutting speed. However, this saw produces on the finishing surface a stripe-pattern based on the saw feeding, and moreover it has a demerit that the segment tends accidentally to break.

(3) As referred to above, the plate-form saws are of two types, the gang saw and the band saw. The fixing means of the abrasive granule layer is similar as in the segment type saw, and therefore the advantages and disadvantages thereof are almost same as in (2) above.

The inventor of this invention has earnestly studied to make use of the merits of the conventional articles and eliminate the demerits thereof, and as a result he has succeeded in developing the present invention.

The major object of the invention is to provide a diamond saw for cutting hard materials, in which a steel plate is firmly fixed with a sintered abrading body consisting of diamond abrasive granules and bonding metal powder, the sintered abrading body including diamond abrasive particles embedded in a matrix, characterized in that a plurality of grooves are provided on the surface of both the front and back side faces of the sintered abrading body, and the grooves are arranged in zigzag phase positions.

According to the invention, the saw's cutting ability is improved compared with the conventional articles, the cutting speed is increased, the strength of the abrading body including abrasive granules is improved, and therefore, the abrading body including abrasive granules is prevented from prematurely tearing-off and breaking thereby improving the saw's safety when in use. Also, less abrasive granules need be used, and further, saw life can be prolonged.

BRIEF DESCRIPTION OF THE DRAWINGS

The invention will now be described more in detail with reference to the accompanying drawings, by way of embodiment examples, in which:

FIG. 12 is a plan view along a first side of a continuous type circular saw having a reduced number of corrugations spiraling clockwise;

FIG. 13 is a side view of the saw of FIG. 12;

FIG. 14 is a sectional view along line 14—14 of the saw of FIG. 12;

FIG. 15 is a sectional view along line 15—15 of the saw of FIG. 12; and

FIG. 16 is a plan view along a second side of the saw of FIG. 12.

DETAILED DESCRIPTION OF THE PREFERRED EMBODIMENTS

Figure 1:
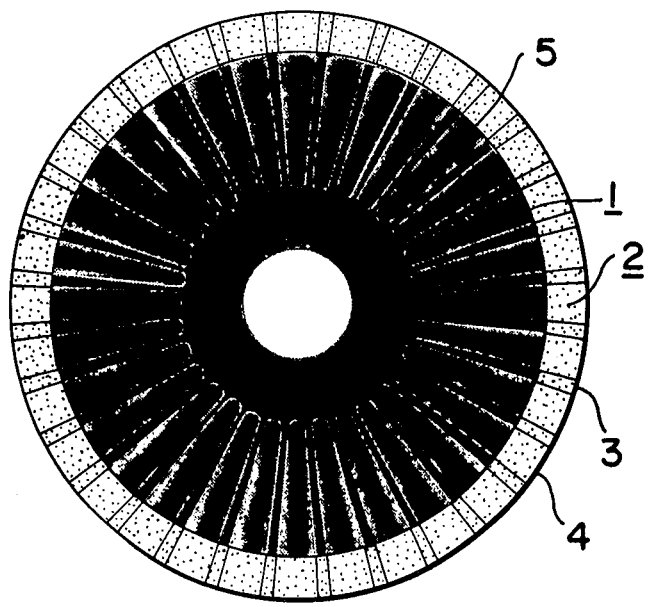
FIG. 1 is a plan view of a continuous type circular saw.
Figure 2:
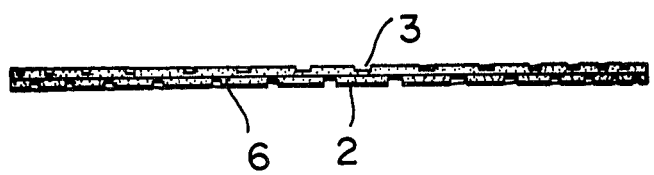
FIG. 2 is a side view of FIG. 1.

As referred to above, FIGS. 1 and 2 show examples of a continuous type circular saw. Reference numeral (1) designates a disc made of steel, and reference (2) is a sintered abrading body including diamond abrasive particles embedded in a matrix. The sintered abrading body (2) consists of a mixture of diamond abrasive particles and a bonding metal powder. Reference (3) designates a plurality of grooves indented on the surface of the sintered abrading body, and these grooves (3) have openings, as shown in the drawings, at the inside and outside edges of both the front and back side faces of the sintered abrading body. The outer circumferential flange of the circular steel plate (1) is provided with thin portion (6), and the sintered body (2) is simultaneously sintered holding the thin portion (6) from both sides. As shown in FIG. 2, the grooves (3) are arranged in zigzag phase positions. The edges of the grooves are active as a cutting saw thanks to the grooves in such an arrangement, and since a great number of grooves are provided the cutting ability is improved while the cutting speed increases. Further, the present saw has an excellent discharging of chips and an improved radiation efficiency and the ability to prevent the saw surface from choking owing to the effective outward flow of cooling air or water.

Figure 3:
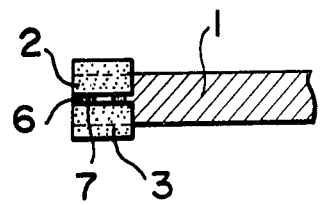
FIGS. 3 and 4 are partly sectional views each showing a fixing condition of the sintered abrading body including diamond abrasive particles embedded in a matrix, to a steel plate.

As shown in FIG. 3, preferably the thin portion (6) is provided with a plurality of piercing orifices (7) which can have any desired shape and dimension. In fixing the sintered abrading body, the sintered abrading body of both the front and back sides are simultaneously sintered in integrity thereby being useful for increasing the strength.

Figure 4:
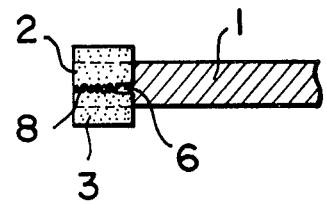

FIG. 4 shows a modification of the thin portion (6), a portion of which is replaced by a wire-netting (8) whereby the sintered body (2) is more integrated.

In FIG. 1, reference (5) designates a radial, corrugated portion provided in the circular steel plate (1). Such provision of the corrugated portion (5) enhances the strength of the circular steel plate, and therefore it becomes possible to lower the cost by using steel plate thinner than conventional articles. Furthermore, by construction of the saw in such a manner that the direction of the corrugations in the corrugated shape is radial, not including the center of the disc, it is possible to further enhance the strength of the disc.

Figure 5:
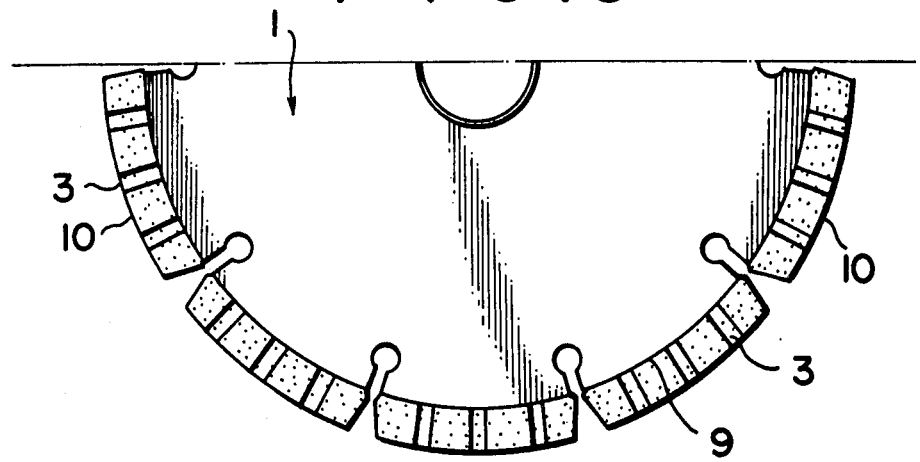
FIG. 5 is a plan view of a segment type circular saw.
Figure 6:
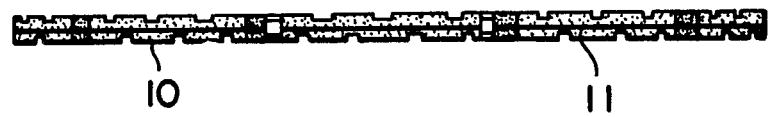
FIG. 6 is a side view of FIG. 5.

In case the diameter of a circular saw is over 300 mm, the saw can be a segment type circular saw as shown in FIGS. 5 and 6. In FIGS. 5 and 6, reference (10) is an arcuate segment, and one previously sintered as a segment is used. The arranging positions of the grooves (3) are in zigzag phase in both the front and back sides as in the example of FIGS. 1 and 2. In this example, the outer circumferential flange of the circular steel plate (1) is not provided with a thin portion. Also, the arcuate segment is directly fixed by brazing to the outer periphery (9) of said steel plate as in conventional articles, but it is preferable to arrange a reinforcing, perforated thin plate or a wire-netting (11) as shown in FIG. 6, at the center of the arcuate segment. The function and effect of the reinforcing, perforated thin plate or the wire-netting are the same as the examples of FIGS. 3 and 4.

Figure 7:
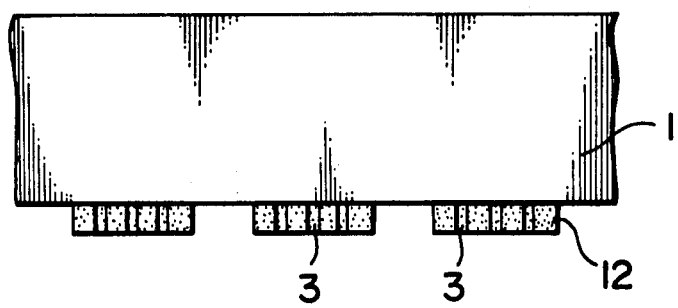
FIG. 7 is a plan view of a plate-form saw.
Figure 8:
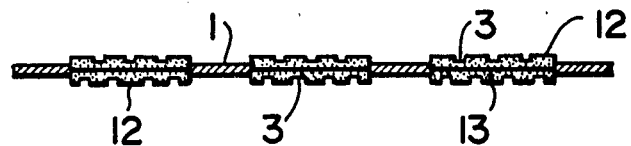
FIG. 8 is a side view of FIG. 7.

FIGS. 7 and 8 shows an example in which the present invention is applied to a plate-form saw, i.e. a band saw or a gang saw. In this case each segment (12) is rectilinear and the grooves (3) are arranged in zigzag phase in both the front and back sides of the segment. This segment (12) is sintered in such a state that a reinforcing, perforated plate or a wire-netting (13) is held therewithin, and it is all right to secure the segment (12) to the base plate (1) by brazing means as in known articles.

Figure 9:
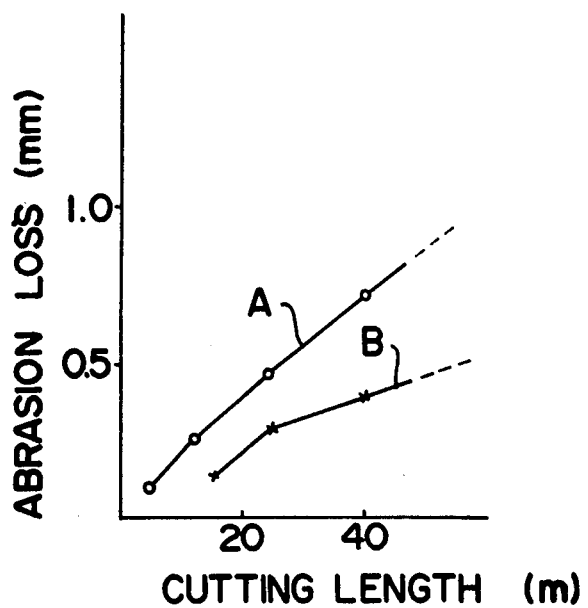
FIGS. 9 and 10 are graphs each comparing the abrasive loss and the power consumption between the present article and the conventional articles.
Figure 10:
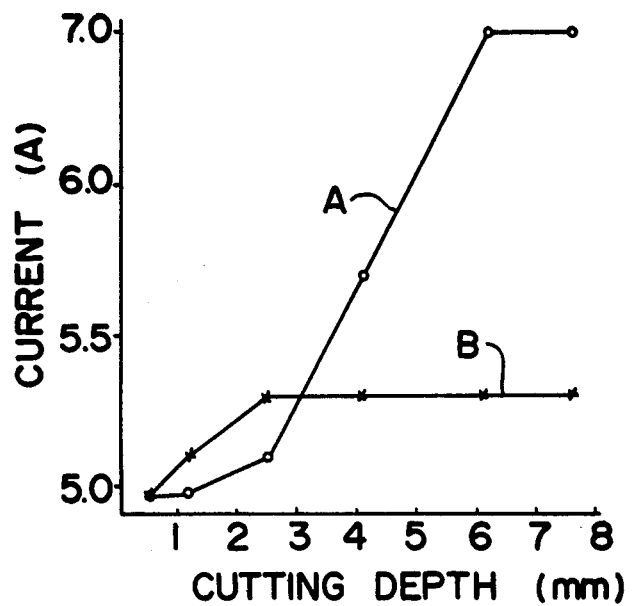

FIGS. 9 and 10 show graphs of comparison between the present saw and the conventional saws, and they show the results in which the present saw and the conventional saws are compared under the following conditions:

(1) Sample:
  A: Conventional segment type circular saw
  B: Circular saw of the invention (of the type in FIGS. 1 and 2)
(2) Size: Both of 105 mm diameter and 2.0 mm thick blade
(3) Material to be cut: Granite (produced in Inada, Japan)
(4) Infeed: 7 mm
(5) Feed: 130 mm/min.
(6) Number of rotations: 12,000 RPM
(7) Power supply: Disc grinder (Handy)

As is clear from FIG. 9, the abrasive loss of the present article B is less than about 60% of the conventional article A, while as clear from FIG. 10, even if the cutting depth is enlarged the present article does not increase the power consumption. That is, it will be evident the present article is superior in cutting ability over the conventional article.

Since the invention is constituted as described above, it exhibits the following excellent effects, compared with the conventional saws:

(1) Circular saw:
  a. It has the merits in combination of both the continuous type and the segment type. That is, a great number of grooves are provided at both sides of the sintered body so that it possesses a cutting ability of the segment type and a strength of the continuous type.
  b. By arranging lots of grooves in zigzag phase at both side faces, chips are well discharged, radiation efficency is improved, and choking by seizure does not occur, so that cutting ability and working efficiency are both improved.
  c. The outer periphery of the base plate is provided with a perforated, thin portion or a wire-netting, and the blade portion is simultaneously sintered, and therefore the strength is enhanced thereby preventing the blade portion from breaking. Accordingly, the safety is ensured very much while the saw life is prolonged.

(2) Plate-form saw:
The side faces of each segment are provided with lots of grooves, and moreover, the saw is reinforced with a perforated, thin plate or a wire-netting, so that as a result of tests it has been confirmed that this saw has the same function and effect as in the circular saw.

(3) In any type of saw, by arranging a great number of grooves it will suffice to use a less amount of mixture consisting of diamond granules and binding metal powder which are used in the sintered abrading body including diamond abrasive particles embedded in a matrix, and the present saw is economical from the cost point of view.

Figure 11:
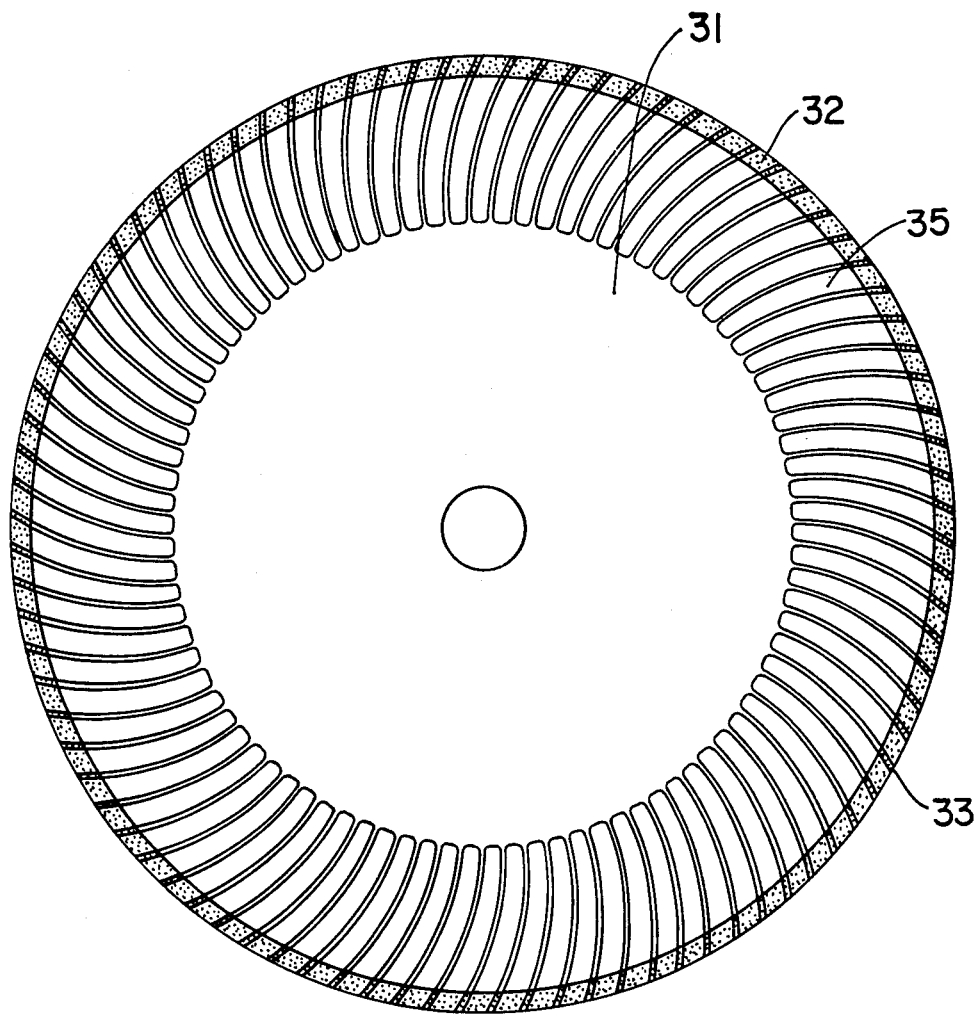
FIG. 11 is a plan view of a continuous type circular saw with curved grooves having spirally curvilinear con- figulation.

FIG. 11 shows another circular saw. Reference numeral (31) designates a disc made of steel and reference (32) is a sintered abrading body including diamond abrasive particles embedded in a matrix. Reference numeral (35) designates a plurality of corrugations provided in each of the side faces and reference numeral (34) designates a plurality of recesses between corrugations. The sintered abrading body (32) consists of a mixture of diamond abrasive particles and a bonding metal powder. Reference (33) designates signates a plurality of grooves indented on the surface of the sintered abrading body. While the recesses and the corrugations of FIG. 1 are of the configuration of rectilinear lines, the recesses and the corrugations of FIG. 11 are of the configuration of curvilinear lines. In both cases, the recesses are arranged almost radially. The abrading body grooves (33) coincide with and communicate with the recesses (34) between corrugations (35) of the support disc. The abrading body grooves (33) and the corrugations (35) are of the configuration of spirally curvilinear lines having optional directions, and the grooves are arranged almost radially.

The disc saw of the present invention for cutting stone materials and the like is firmly secured in the circumference of its base plate with a flat, ring-like layer comprising diamond abrasive granules. Since diamond abrasive granules are expensive it is necessary to make the abrasive granule layer as thin as possible. Further, by making the abrasive granule layer thin then the cutting power advantageously increases. This necessitates it to use a thin steel plate as the base plate, but a thin plate cannot be saved from lowering resistance against the external bending force. The disc saw of the present invention as illustrated in FIG. 1 is provided on the base plate with radial corrugations, so that if bending force is applied onto the surface of the base plate in the radial direction about the center of the base plate, the base plate is bent about the creases of said radial lines. Unlike in FIG. 1, however, the embodiment of FIG. 11 does not draw radial lines so that even if said bending force is applied onto the base plate the base plate cannot be easily bent, allowing the strength of the base plate to be increased distinctively.

U.S. Pat. No. 3,754,359 (Scandaletos) describes two cases, in one of which in the abrasive tools the paths of cooling water are constructed with rectilineal ribs and in the other of which the paths are constructed with curvilineal ribs. It further describes that it increases flow of the cooling water to use curvilineal ribs, and therefore the cooling capability is enhanced while improving the cutting exhaust.

This U.S. patent is characterized by making the ribs curvilineal for the only purpose of increasing the amount of the pasing water, and it totally differs in technical idea from the present invention which intends to enhance the strength of the disc saw itself.

FIGS. 12–16 show still another circular saw. Reference numeral (41) designates a disc or base plate made of a hard metal such as steel and reference (42) is a ring-like abrasive granule layer including diamond abrasive particles embedded in a matrix of metal powder. Reference (43) designates a plurality of communication grooves provided on the surface of the abrasive granule layer (42). These communication grooves (43) are arranged approximately radially on the abrasive granule layer (42) extending toward the center of the disc (41) from the periphery thereof.

A plurality of radially arranged corrugations (45) are formed on both the front and back faces (51, 52) of the disc (41) as is evident from FIGS. 12 and 16. A non-corrugated disc portion (53) is provided radially inwardly of the abrasive granule layer (42) and between the corrugated portions (45) as may be seen from FIG. 12.

The communication grooves (43) communicate with the corrugations (45) to allow fluid and cut particles to pass easily. The number of communication grooves (43) is larger by an integral number than the number of corrugations (45) in the disc (41). The corrugations (45) can have any desired angle to a radial line passing through the center of the disc (41). Preferably, the corrugations (45) are spirally curved as shown in FIGS. 12 and 16.

The flat broad spaces designated with reference (53) in FIG. 12 are obtained by decreasing the number of corrugations of the radial, corrugated portions (5) in FIG. 1. Since the flat space (53) in FIG. 12 is broader than the space between corrugations in FIG. 1, even said spaces (53) are filled with a larger amount of fluid (air or water). Therefore, a larger amount of water is also fed by means of the pumping action based on the rotation of the disc saw thereby increasing the exhausting capability to the debris which flows into said spaces (53). On the other hand, a larger amount of water enhances the cooling capability, thence the radiating capability of the frictional heat. Accordingly, the present invention has the effects not only of preventing thermal strain of the base plate but also of preventing the deterioration of cutting ability, which is caused by the debris which is deposited on the working surface.

The location of each corrugation (45) on the disc (41) is in the same row as the location of the communication groove (43) formed on the surface of the abrasive granule layer (42). The corrugations (45) on the disc (41) and the communication grooves (43) on the layer (42) can be arranged in the same direction or in any desired direction.

As with the embodiments of FIGS. 4 and 6 a wire-netting can be incorporated in the ring-like abrasive granule layer (42). The abrasive granule layer and the wire-netting can be firmly sintered together at the outer periphery of the disc with the corrugations on the disc and the communication grooves (43) on the surface of the abrasive granule layer (42) being formed together simultaneously.

The diamond saw of FIGS. 12–16, can cut stone materials as well as concrete products, rock, ceramics, glass, artificial stones and fiber-reinforced plastics.

Although the invention has been shown and described with reference to preferred embodiments, it is obvious that modifications and alterations will occur to others upon a reading and understanding of this specification. It is intended to include all such modifications and alterations insofar as they come within the scope of the appended claims or the equivalents thereof.

The disc saw of the present invention has corrugated portions (5), (35) and (45) radially arranged on the surface of the base plate, and the outer circumference of the base plate is provided with grooves (3), (33) and (43) communicating with said corrugated portions. This allows the debris generated between the base plate surface and the wall face of cutting and reached the recesses of the corrugated portions to be discharged by the flow of air or water.

According to the present invention, thus it is possible to avoid the drawbacks which were likely to occur in conventional disc saws, such as lowering cutting capability which is caused by wear of the base plate surface owing to the debris being grasped between the base plate surface and the wall face of cuttigg, by the thermal strain occurring in the base plate or by the clogging of the abrasive granule layer because of the debris melt adhered to the layer.

U.S. Pat. No. 3,742,655 (Oliver) describes a grindstone comprising a base plate whose surface is largely bent. This grindstone is a tool which is used in rubber tire manufacturing process to shear the black shell in the surface of the tire off thereby to expose the white portion.

Thus the disc saw of the present invention is a tool for cutting the mating object whereas said U.S. patent relates to a tool for shearing the surface of the mating object off. The two inventions have different technical ideas in any aspect of the use, function and structure.

Additionally, even if by making a device in which the abrasive grit forming a cutting blade in the Oliver patent is replaced by the teeth (42) comprising diamond abrasive granules as shown in FIG. 1 of U.S. Pat. No. 3,127,887 (Metzger), such device cannot have the same functions as the disc saw of the present invention. Thus it cannot be said that the present invention is a technique easily created on the basis of the Oliver patent or the Metzger or both of them as known art.

Having thus described the invention, it is now claimed:

1. A diamond saw for cutting hard materials such as stone, rock or concrete, comprising:
   a support disc made of steel having an outer periphery and a pair of side faces, a plurality of corrugations being provided in each of said side faces; and,
   an abrading body which is secured to said outer periphery of said support disc, said abrading body including a mixture of diamond abrasive particles and a metal bonding powder, a pair of side faces being provided on said abrading body with each side face having a plurality of grooves, said abrading body grooves coinciding with and communicating with recesses provided between said corrugations of said support disc, wherein the abrading body grooves are of the configuration of curved lines having optional directions, and the grooves are arranged almost radially so as to provide a resistance free passage for outflow of abraded particles of the cut hard material and an associated coolant thereby effectively dissipating heat generated by the saw.

2. The diamond saw for cutting hard materials as described in claim 1, wherein the grooves provided at both the front and back side faces of said abrading body are positioned in zigzag phase.

3. The diamond saw for cutting hard materials as described in claim 1, wherein a thin, narrow, support portion is provided on a periphery of said support disc.

4. The diamond saw for cutting hard materials as described in claim 3, wherein said thin support portion is made of wire-netting and is enclosed inside of said abrading body and secured onto said periphery of said support disc by sintering.

5. The diamond saw for cutting hard materials as described in claim 1, wherein said corrugations of said support disc are radially arranged and wherein said corrugations have the configuration of curvilinear lines having optional directions.

6. The diamond saw for cutting hard materials as described in claim 1 wherein said support disc is provided with a plurality of circumferentially spaced split extending radially inwardly from said periphery of said disc wherein said split define a plurality of arcuate segments on said support disc, a separate arcuate abrading body being secured to each of said segments and wherein each abrading body has side faces in which said grooves are positioned on both side faces of said disc alternately in zigzag phase and wherein wire-netting is enclosed in each segment.

7. The diamond saw for cutting hard materials as described in claim 1 wherein each of said support disc corrugations gradually increases in width and depth as it extends from a center of said disc to said outer periphery.

8. A diamond saw for cutting stone materials and other similar hard materials, comprising:
a support disc provided with a plurality of approximately radially arranged corrugations;
an annular abrasive granule layer consisting of a mixture of diamond abrasive granules and metal powder, said layer being fixed onto the outer periphery of said support disc;
a plurality of grooves directed from the outer periphery of said abrasive granule layer toward the center of said disc, said grooves being indented on both the front and back faces of said abrasive granule layer alternately, and wherein the number of corrugations on said support disc are less than the number of grooves on said abrasive granule layer so that said corrugations divide the surface of said support disc into several broad spaces.

9. The diamond saw as described in claim 8 wherein the direction of the corrugations provided on the surface of said disc form an optional angle to a radial line passing through the center of the disc, and wherein in a plan view, the corrugations are spirally curved.

10. The diamond saw as described in claim 8 wherein the location of each corrugation arranged on the surface of said disc is in the same row as the location of the grooves made on the surface of the abrasive granule layer, and wherein said corrugations and said grooves are in a communicating relationship for passing fluid and as a result the abraded particles contained in said grooves are expelled outwardly.

11. The diamond saw as described in claim 8 wherein a wire-netting is enclosed inside the annular abrasive granule layer, said abrasive granule layer and said wire-netting being firmly secured together at the outer periphery of the support disc by a sintering process, and wherein the corrugations on the surface of the support disc and the indented grooves on the surface of the abrasive granule layer are simultaneously formed together during said sintering process.

* * * * *